United States Patent
Bennett et al.

(10) Patent No.: US 7,640,210 B2
(45) Date of Patent: *Dec. 29, 2009

(54) FINANCIAL INFORMATION PORTAL

(75) Inventors: Michael Bennett, San Francisco, CA (US); John Bergquist, San Francisco, CA (US); Susan Nesbitt, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/030,127

(22) Filed: Feb. 12, 2008

(65) Prior Publication Data

US 2008/0133413 A1 Jun. 5, 2008

Related U.S. Application Data

(63) Continuation of application No. 09/896,438, filed on Jun. 28, 2001, now Pat. No. 7,370,011.

(60) Provisional application No. 60/214,662, filed on Jun. 28, 2000.

(51) Int. Cl.
*G06Q 40/00* (2006.01)

(52) U.S. Cl. .......................................... 705/39

(58) Field of Classification Search ........................ None
See application file for complete search history.

(56) References Cited

U.S. PATENT DOCUMENTS

| | | | |
|---|---|---|---|
| 6,023,684 A | 2/2000 | Pearson | |
| 6,029,141 A | 2/2000 | Bezos et al. | |
| 6,199,077 B1 * | 3/2001 | Inala et al. | 715/201 |
| 6,317,783 B1 * | 11/2001 | Freishtat et al. | 709/218 |
| 6,434,607 B1 * | 8/2002 | Haverstock et al. | 709/217 |
| 6,594,766 B2 | 7/2003 | Rangan et al. | |
| 6,907,401 B1 | 6/2005 | Vittal et al. | |
| 7,370,011 B2 | 5/2008 | Bennett et al. | |

(Continued)

OTHER PUBLICATIONS

Chapman, D. Brent; Zwicky, Elizabeth D. Building Internet Firewalls. O'Reilly & Associates. 1999. pp. 45-47.*

(Continued)

*Primary Examiner*—Jason M Borlinghaus
(74) *Attorney, Agent, or Firm*—Morrison & Foerster LLP (57) ABSTRACT

In a system for a financial institution or other information maintainer, has a list of its account holders that also have accounts with a portal and have agreed to link their portal account and user account with the financial institution or other information maintainer. When a user logs onto the user's portal account, the portal server can request information from the user account over a trusted link to the financial institution or other information maintainer. The portal can request data for a particular user over the trusted link or can request bulk data for all users, using portal authentication data, as opposed to user authentication data. In the preferred embodiment, the actions allowed on a user account by the portal authentication data are more restrictive than the actions allowed by the user authentication data. As an example, a brokerage house might allow the portal to read recent transaction data for the user but not to make trades on the user's account, while the brokerage house would allow the user to perform many more actions if the user logged on directly to the brokerage house's system using the user's authentication data.

21 Claims, 5 Drawing Sheets

U.S. PATENT DOCUMENTS

2001/0037415 A1* 11/2001 Freishtat et al. ............. 709/328

OTHER PUBLICATIONS

"Corillian Voyager eFinance Suite on Microsoft BackOffice: Proven Scalability," Microsoft Corporation, 1999. 17 pages.

Bauwens, Philippe. "Press Information: Summary of Siemens Nixdorf's Presentations at CeBIT 96." Located at http://www.sni.be/en/news/press/it.htm> visited on Apr. 18, 2000. Fourteen pages.

Lewis, Matt. "CheckFree Corporation Announces Record Quarterly and Six-Month Revenues Increases Financial Institutions Under Contract to 142," located at <http://www.investquest.com/InvestQuest/c/ckfr/ne/earings/ckfr26.txt> visited on Apr. 18, 2000. Seven pages.

"Open Financial Exchange and Microsoft," located at <http://fourier.coker.edu/robinb/botc9.html,> visited on Apr. 18, 2000. Two pages.

"Traditional Banking makes its move. Integrion and IBM," located at <http://fourier.coke.edu/robinb/botc8.html> visited on Apr. 18, 2000. Three pages.

Chapman, D.B. et al. (1995). "Building Internet Firewalls," O'Reilly & Associates, Inc. pp. 45-47.

Flanigan, M. and Pecorara, J. "Yodlee and Exodus Team For Secure Personal Information Management," located at <http://www.yodlee.com/corporate/pressrelease/exodus.htm> visited on Apr. 12, 2000. Two pages.

Keyes, J. "Banking Technology Handbook," CRC Press. 1999. pp. 5-1 and 20-17.

Kyle, R.C. (Sep. 1, 1999). "Property Management. Dearborn Real Estate Education," pp. 50-51.

Shea, R. "L25P:Implementation and Operation." Addison-Wesley Professional. Reading, MA. Sep. 24, 1999. p. 191.

"Sample 'My Yodlee'" Page, located at <http:www.yodlee.com/demo.html> visited on Apr. 12, 2000. Two pages.

The Yodlee Platform, located at <http:www.yodlee.com> visited on Apr. 12, 2000. Two pages.

"Yodlee.com launches a powerful new consumer service to help you take control of your life online," located at <http://www.yodlee.com/corporate/pressrelease/launchfinal.html> visited on Apr. 12, 2000. Two pages.

"15 North American Banks and IBM Form Company To Offer Electronic Banking and Commerce Services," located at <http://www.integrion.com/news/15banks.html> visited on Apr. 18, 2000. Three pages.

"Integrion Launches End-to-End Industry Standard For Electronic Commerce," located at <http://www.integrion.com/news/story1.html> visited on Apr. 18, 2000. Five pages.

Intuit Announces 15 More Financial Institutions To Deliver Online Banking, located at <http://www.intuit.com/corporate/press_releases/020996.html> visited on Apr. 18, 2000. Two pages.

"Q:How do I download prices from a Canadian Exchange?" located at <http://www.intuit.com/support/quicken/faqs/sin2/1846.html> visited on Apr. 11, 2000. Three pages.

"Q:How do I track investments in the Portfolio window?" located at <http://www.intuit.com/support/quicken/faqs/mac/2161.html> visited on Apr. 11, 2000. Two pages.

"Quicken 99 Helps Consumers Find Money-Savings Opportunities and Make Better Financial Decisions," located at <http://www.intuit.com/coproate/press_releases/090989.html> visited on Apr. 11, 2000. Five pages.

"Intuit, Microsoft, and CheckFree Create Open Financial Exchange," located at <http://www.ofx.net/ofx/pressget.asp?-5> visited on Apr. 18, 2000. Two pages.

"S1 Corporation Files Suit Against Corillian Corporation For Patent Infringement," located at <http://investor.s1.comireye/ir_site.zhtml?ticker=sone&script-410&layout-6&item_id-81111> visited on Apr. 11, 2000. Three pages.

"S1 Corporation Grated Patent For Advanced Online Financial Services Technology," located at <http://investor.s1.com/ireye/ir_site.zhtml?ticker+sone&script=410&layout-6&item_id=81111> visited on Apr. 11, 2000. Three pages.

"VerticalOne Corporation To Offer Internet Users One-Stop For Managing Online Personal Content and Account Information," located at <http://www.verticalone.com/pr/pr52599.html> visited on Apr. 11, 2000. Two pages.

SEC Accession No. [0000950109-96-004207], located at <http://www.sec.gov/Archives/edgar/data/351139/000095019-96-004207.txt>, visited on Apr. 18, 2000. Five of 170 pages.

* cited by examiner

FINANCIAL INFORMATION PORTAL

CROSS-REFERENCE TO RELATED APPLICATIONS

This application is a Continuation of U.S. Ser. No. 09/896,438, filed Jun. 28, 2001 which claims priority from U.S. Provisional Application No. 60/214,662, filed Jun. 28, 2000. The applications are hereby incorporated by reference in their entirety for all purposes.

FIELD OF THE INVENTION

The present invention relates to a financial information portal that provides portal users with information from a plurality of user accounts at a plurality of financial institutions or other information maintainers and presents a unified display of such information to the user who has custody of the user accounts.

BACKGROUND OF THE INVENTION

With the increase in popularity of the Internet, a global internetwork of networks that allow for data transport between Internet nodes including nodes accessible by consumers and financial institutions, there has been an increase in the number and variety of uses of the Internet. For example, consumers can interact with merchants over the Internet to obtain information about the merchant's products or to make purchases. Also, some merchants and service providers that maintain data about the consumer can provide that data over the Internet. For example, financial institutions maintain data about their customers, such as transaction histories, balances and the like, and provide that data to their customers, often in the form of a printed statement. A more convenient method of providing the information to customer might be to allow the customer to connect a customer client to a server operated by the financial institution so that the customer client can obtain the customer's data and present the customer's data to the customer.

This client-server approach is quite common. A typical form of this service couples the financial institution's databases to a HyperText Transport Protocol (HTTP) server so that a customer using an HTTP client, such as a Web browser, can access the HTTP server and get the customer information. One drawback of this arrangement is that when the customer has many different accounts, the customer cannot see the data in one place. Some financial institutions have used this fact to create consolidated services, such as a checking account, savings account, credit card and brokerage account, all offered by one financial institution. While this is convenient for some customers, many other customers prefer to pick and choose the best of each type of service from their preferred provider.

Figure 1:
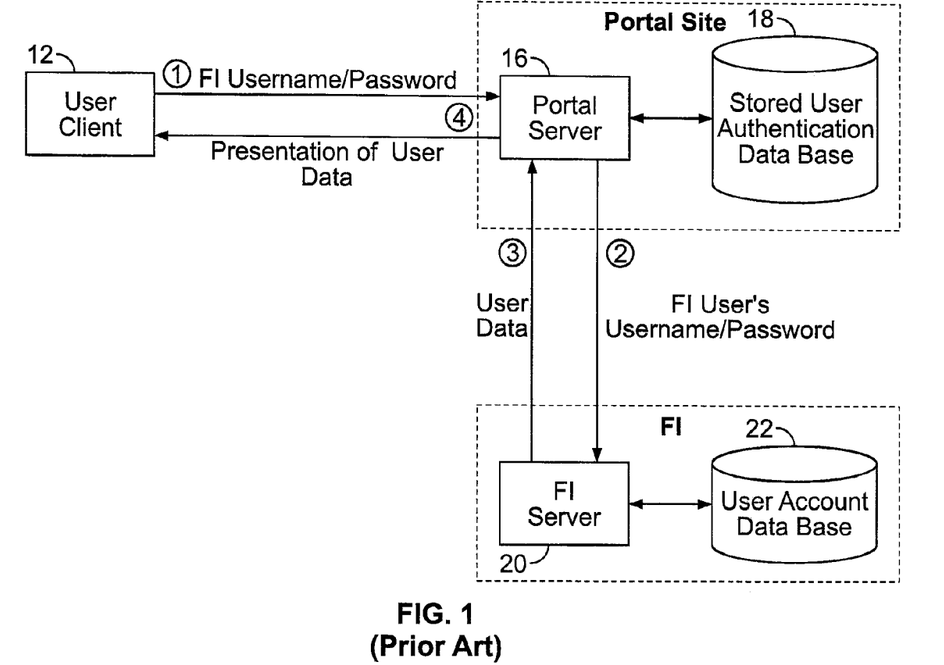
FIG. 1 is a block diagram illustrating a conventional "stand-in" system.

One portal solution is the "stand-in" system, where a portal operator stands in place of the user to get data from the financial institution. FIG. 1 is a block diagram of such a system. As shown there, a user interacts with the system using a user client 12 that is coupled to a portal site 14. Portal site 14 is shown comprising a portal server 16 and a stored user authentication database 18. Portal server 16 is coupled to a financial institution (FI) server 20 at a financial institution, which is shown coupled to a user account database 22. The connections shown provide a path for user client 12 to provide the user's FI username and password to portal server 16, a path for portal server 16 to read and write user authentication data (such as username, password, associate FI, etc.) to database 18, a path for portal server 16 to provide user authentication data to FI server 20, a path for FI server 20 to read and write user account data in database 22, and paths for the user account data to flow from FI server 20 to portal server 16 and then to user client 12.

To set up a stand-in arrangement, the user sets up an account with a portal operator, including portal user authentication data, such as a user ID and password that authenticates the user to the portal. The user then provides the portal operator with all the financial institution authentication data the user uses to connect to the financial institution servers and an indication of the financial institution (e.g., domain name, URL, or IP address). The portal operator stores the user's financial institution authentication data at its servers. When the user makes a request for information from the portal, the portal server connects to the financial institution server and, using the user authentication data, logs on as the user and gets the information it needs. In some cases, since the financial institution does not necessarily know that a computer posing as the user is accessing the financial institution server and not the user directly, the portal server must do some additional processing to format the data in a form suitable for computer processing, if the information is only obtainable in a form suitable for display to the user. However, in many cases today, financial institution on-line services provide OFX connectivity, where the financial institution does not assume that an interactive user is the client, but instead provides information according to the OFX protocol.

However the data is formatted, the financial institution generally cannot control what the portal system does with the user's account when the portal system logs on as the user. Consequently, there is a risk that if a database of user IDs and passwords stored at the portal is compromised, the attacker could then access many users' financial institution accounts and even make transactions on those accounts. If such compromise occurs, it would be difficult to determine which transactions are legitimate and would require all the affected users to change their passwords and possibly even change their user IDs.

Another solution that doesn't require storage of financial institution user authentication data at the portal is a client-handoff system, wherein the user logs onto the financial institution system using an interactive client that is programmed to get the user's information from the financial institution system and provide it to the portal site for storage there.

Figure 2:
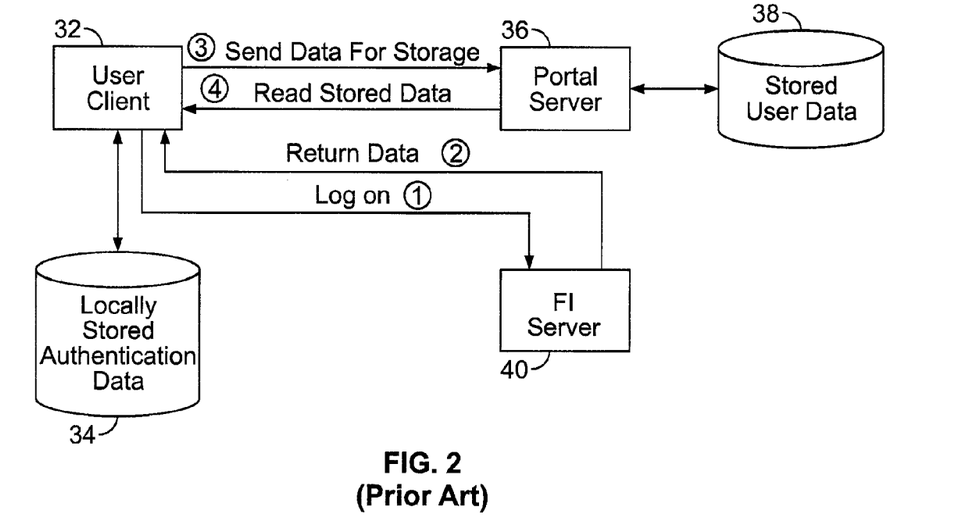
FIG. 2 is a block diagram illustrating a conventional client-handoff system.

FIG. 2 is a block diagram illustrating such a system. The diagram shows a user client 32, a database 34 for locally stored user authentication data, a portal server 36, a database 38 for stored user data and an FI server 40. In one embodiment of such a system, the user client is a browser that includes an authentication plug-in. The plug-in is programmed to either prompt the user or passively follow the user as the user logs onto the financial institution server and the portal server.

The connections shown provide a path for user client 32 to read and write authentication data to or from database 34, a path for user client 32 to log onto FI server 40, a path for user client 32 to retrieve user data from FI server 40, a path to provide the retrieved data from user client 32 to portal server 36 (with the data possibly also stored at user client 32), a path for portal server 36 to read and write data to or from database 38, and a path between user client 32 and portal sorer 36 over which user client 32 might request user data and over which portal server 36 would provide user data to user client 32. Of course, for the system shown to be more desirable than a direct log on system, portal server 36 would provide the user's data in a more desirable form than could, or would, be provided by FI server 40. For example, portal server 36 might format the data in a better format and/or might combine the user's data from multiple FI servers to provide an integrated view of the data.

In operation, the user would log user client 32 onto the FI server 40 and retrieve user data stored there, then provide that user data to portal server 36. Unless the user performs that action with respect to each of the user's FI's, the data at portal server 36 might be out of date when user client 32 retrieves a view of the data from portal server 36. Thus, a disadvantage of this approach is that the information at the portal server is not current, but is only current as of the last time the user logged onto the financial institution server and performed a transfer of data to the portal servers.

SUMMARY OF THE INVENTION

In one embodiment of the present invention, the shortcomings of the prior art are overcome. In one such portal information system, a financial institution or other information maintainer, has a list of its account holders that also have accounts with a portal and have agreed to link their portal account and user account with the financial institution or other information maintainer. When a user logs onto the user's portal account, the portal server can request information from the user account over a trusted link to the financial institution or other information maintainer. The portal can request data for a particular user over the trusted link or can request bulk data for all users, using portal authentication data, as opposed to user authentication data. In the preferred embodiment, the actions allowed on a user account by the portal authentication data are more restrictive than the actions allowed by the user authentication data. As an example, a brokerage house might allow the portal to read recent transaction data for the user but not to make trades on the user's account, while the brokerage house would allow the user to perform many more actions if the user logged on directly to the brokerage house's system using the user's authentication data.

A further understanding of the nature and the advantages of the inventions disclosed herein may be realized by reference to the remaining portions of the specification and the attached drawings.

DESCRIPTION OF THE SPECIFIC EMBODIMENTS

In one embodiment of a financial aggregator system that is described below, a user uses a portal to obtain information from a financial institution system, for viewing that data through the portal, thus allowing aggregation of information from multiple sources. It should be understood that the present invention is not limited to financial information. For example, the financial aggregator might aggregate bank account information, stock trades and utility usage. In the figures, distinct instances of like objects are distinguished with parenthetical indices.

In the basic system described herein, a user can accesses his or her transaction data at a financial institution, such as account balance, recent transactions and other data. The system is not limited to financial data, although that is used in many of the examples herein. The user accesses the user data through a portal, thus allowing the user to see user data from a variety of institutions at which the user maintains accounts. The user makes this access through a portal account, which is an account set up between the user and the portal operator. The participating institutions each maintain a list of their users that are also portal users and have signed up for the linking of their accounts. For users of linked accounts, the portal operator is provided a connection, such as a login account, to the financial institutions server to allow the portal operator to get the user data for a specific user. When the portal operator logs on using the portal operator authentication data, the actions that the portal operator can perform on the user data should be more restricted than the actions allowed when the user logs onto the financial institution's server as themselves. For example, conducting transactions or funds transfers might require that the user log onto the financial institution's server as himself or herself.

As used herein, "portal" refers to a service that stands between the user and another service to perform an added value, such as aggregation, presentation, reformatting or transport of data. Typically, a user will have user-specific portal authentication data (PAD) that authenticates the user to the portal. For example, a portal might authenticate the user if the user presents a portal server with a valid portal user ID and a password that goes with that portal user ID. Authentication might be more restrictive in some systems, such as a system wherein the authentication data includes a node address, such as an IP address, thereby limiting access to only those users that can produce a valid portal user ID and the correct password and do it from a particular IP address.

To distinguish from various authentication data, PAD refers to authentication data needed by the user to access the portal's services, while "FAD" refers to authentication data needed by the user to access the financial institution's services and "PFAD" refers to authentication data needed by the portal to access the financial institution's services on behalf of one or more portal users. Note that in the systems shown in FIGS. 1-2, there is no PFAD, since the portal in those systems does not have a relationship with the financial institution to allow the portal to connect to the financial institution servers as the portal.

Basic System

In the basic system, the portal server presents balance and transaction history data for display purposes only. To make changes to the data or to complete transactions, the user would need to log onto the financial institution server. Users register with the portal and have a valid portal ID to access the service. Where interactive response times are needed, the portal might cache all user financial institution data at the portal servers.

Figure 3:
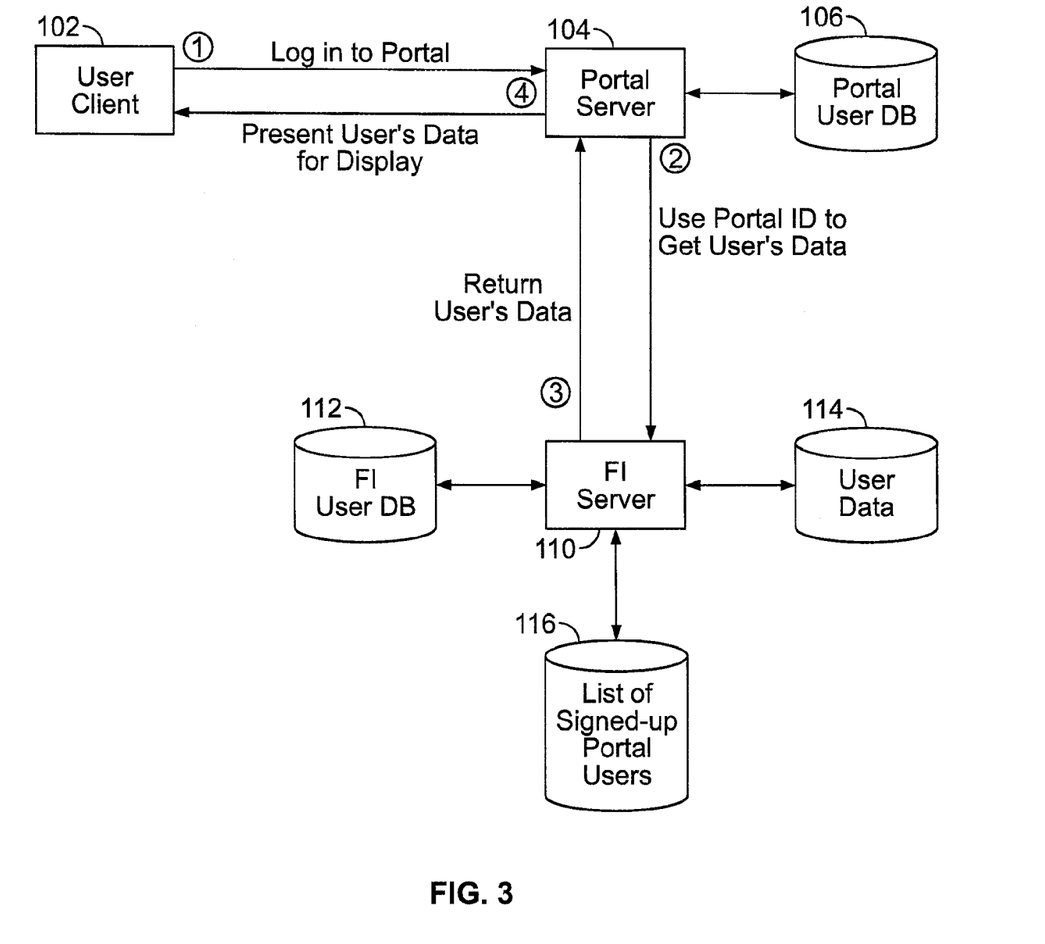
FIG. 3 is a block diagram of an information portal system according to one embodiment of the present invention.

FIG. 3 is a block diagram illustrating such a system. As shown there, the system includes a user client 102, a portal server 104, a portal user database 106, an FI server 110, an FI user database 112, a user data storage 114 and a database containing a list 116 of signed-up portal users. It should be understood that variations of the system might exist that look different from the block diagram of FIG. 3 but that are nonetheless within the teachings of the figure. For example, a typical system would likely have more than one user client, possibly multiple portal servers and usually more than one FI server. At the one (or each, if more than one) FI server, the FI user database, user data storage and list of signed-up portal users might be contained within one database management system or be organized in some other manner in which data is known to be stored.

The connections show provide at least a path between user client 102 and portal server 104, a path between portal server 104 and database 106, a path between portal server 106 and H server 110, and paths (as needed) between FI server 110 and FI user database 112, user data storage 114 and list 116.

In one operation, indicated in FIG. 3 by circled reference numbers repeated in this description parenthetically, a user uses user client 102 to log into portal server 104 (1). The portal server then uses a portal ID to get that user's data from FI server 110 (2). When FI server 110 returns the user's data to portal server 106 (3), FI server 110 is aware that the request came from portal server 104, because portal server 104 logged on using its own authentication information and did not log on as the user. Portal server (106) can then provide the user's data to user client 102 (4), typically aggregated with user data from other FI servers. The display might also include advertisements or information added to the display at the behest of the operator of portal server 104 or its agents, or possibly at the behest of the operator of FI server 110 or its agents.

The financial institution and the portal operator should determine which account types would be within the scope of the implementation (e.g., Checking, Savings, etc.). To keep the systems secure, financial institution transaction capability (such as account transfer functions and bill payment functions) or financial institution account related customer care functions might be limited through the portal.

One process for setting up the necessary accounts will now be described, with reference to FIG. 3. This process assumes that a user has already set up a portal account and an account with a financial institution.

To begin, the user logs onto the portal server and requests that the accounts be linked, usually by selecting a page from the portal web server. The portal server might perform additional authentication at this point. A link on the page at the portal web server is a URL referencing a page on the financial institution's site and includes the user's portal ID in the URL. The financial institution then performs its conventional user authentication and remembers the user's portal ID, storing it in a list of all other signed up users. The financial institution then redirects the user back to the portal site, after recording the user's portal ID and associating it with the user if the user succeeds in authenticating himself or herself with the financial institution server. Thereafter, the portal server can make a trusted server-to-server connection to the financial institution server to get information for one or more signed up users, either on an individual request basis or by nightly batch request for all signed up users. The latter would allow for quicker response times, since the user displays can be pre-generated for the user.

Figure 4:
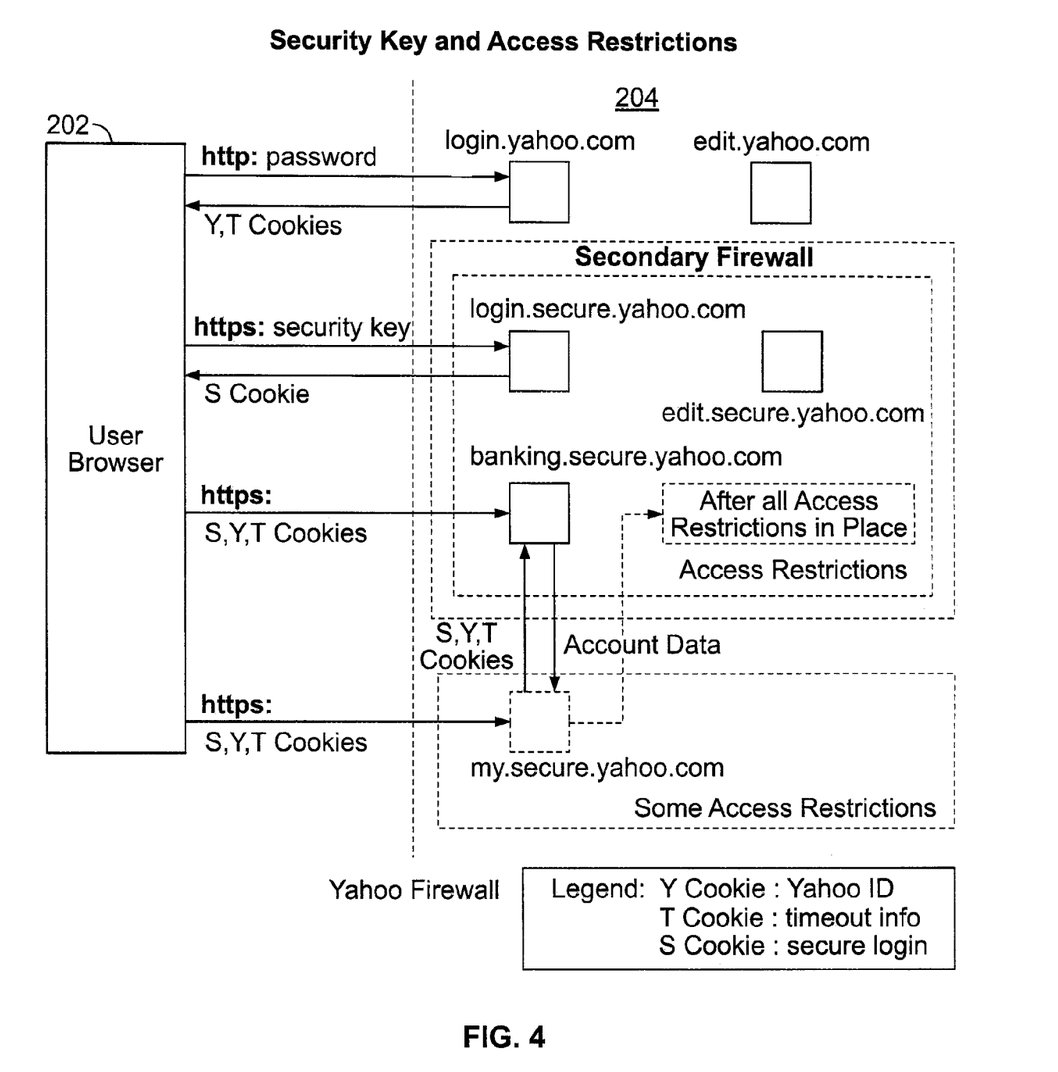
FIG. 4 is a block and data flow diagram showing interactions between a user client and a portal server.

FIG. 4 is a block and data flow diagram showing interactions between a user browser 202 (a specific type of user client) and a portal server 204. In this diagram, portal server 204 is specifically a portal server with an HTTP/HTTPS interface to user browser 202.

Figure 5:
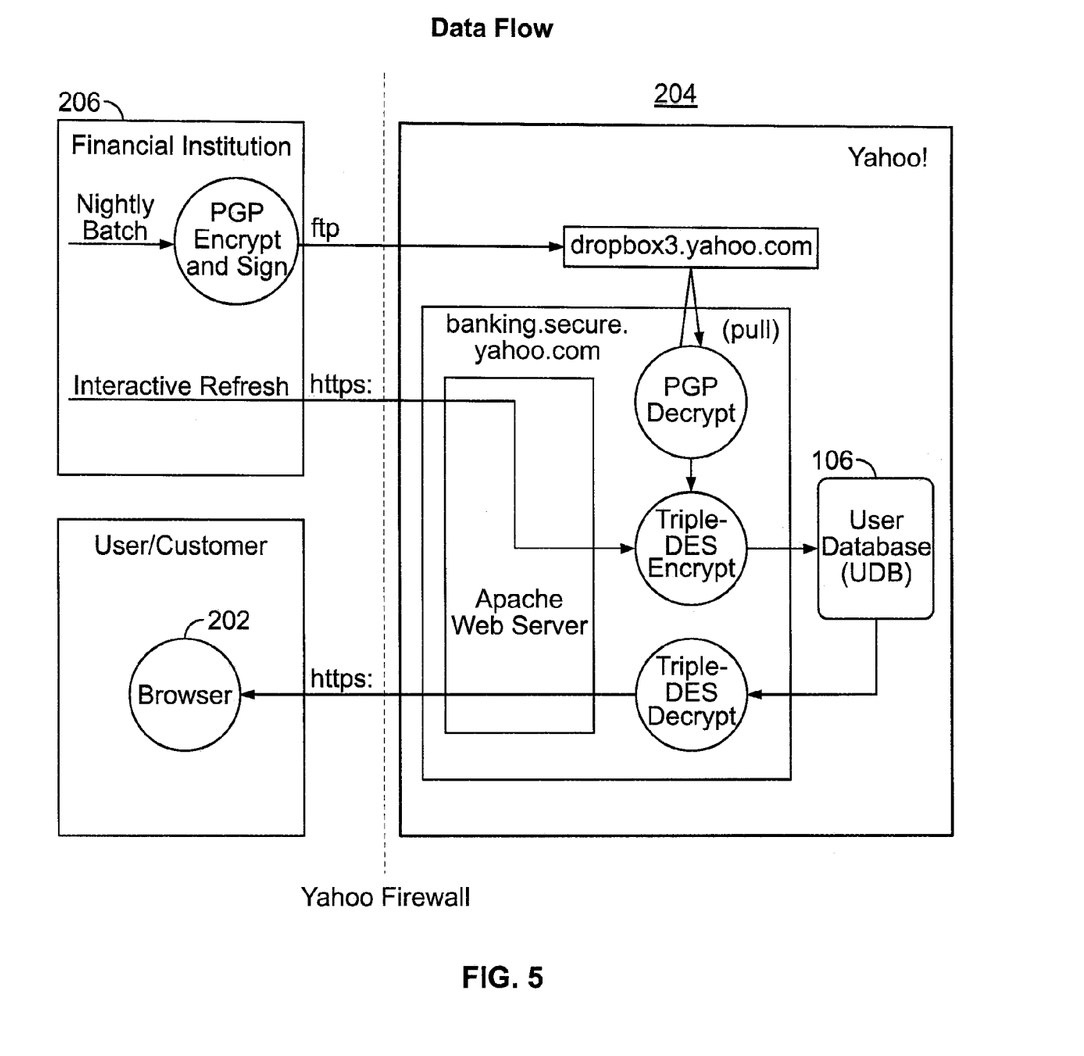
FIG. 5 is a block and flow diagram showing interactions between a portal server a FI server.

FIG. 5 is a block and flow diagram showing interactions between portal server 204 and a FI server 206 and user browser 202.

Overview of User Experience

Figure 6:
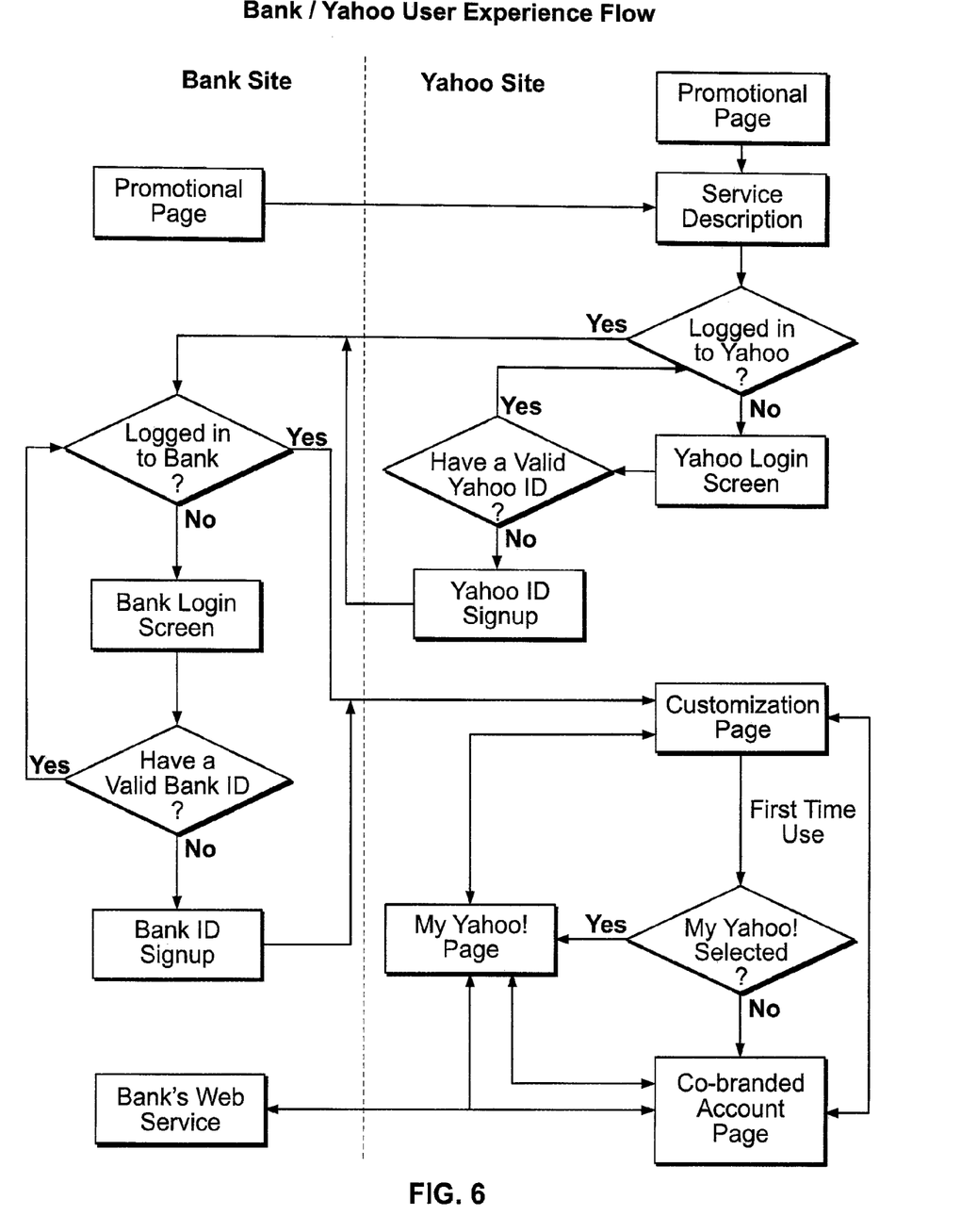
FIG. 6 is a flowchart of a typical user experience.

FIG. 6 is a flowchart of a typical user experience. The experience includes user pre-registration where the user learns about the service through any of a number of advertisements and/or promotional pages (on both the portal and financial institution sites), each of which will have a link to the same detailed product offering explanation page. The user clicks on the link to go to the detailed explanation page. The details of the service are described there. The user will then have an opportunity to "Accept" the service and continue. This page can be hosted at the portal and contain a joint service agreement and links to respective privacy statements.

When the user clicks to sign up for the service, the portal will check to see if the user is currently logged onto a valid the portal account. If not, they will be sent to a standard the portal login page and asked to log in or sign up for a portal User ID. The user is then sent to the financial institution site.

The user will be required to set up a security key required to access financial institution data at the portal site. At the financial institution site, the user is asked to authenticate himself or herself as a valid financial institution customer through a secured login session. They then go through the normal sign up process within the financial institution site, if necessary. After financial institution has authenticated the user, the user will be sent to a customization page, then to a cobranded the portal/financial institution account display page.

At the cobranded the portal/financial institution account display page, the user will see the account descriptor (checking, savings, etc.), balance and transaction history for each account which is handled by the portal.

At the cobranded the portal/financial institution account display page, available credit will be displayed for credit cards and lines of credit, and the credit limit will be displayed for credit cards. Balance information, transaction history and available credit information will include the "As of" date/time stamp sent to the portal by the financial institution. On the user's custom portal page (such as the My Yahoo! page provided to Yahoo! portal users), the user will be able to view the five most recent transactions and current balance for each account. On the portal Finance account information page, users will be presented with current account balances and the most recent 50 transactions for accounts where history information is available.

Users will have the ability to update their account balances by clicking on a "Refresh" button. A user-initiated update will replace the balance for the user's account(s). In this way, the Refresh function provides the user with updated account information and also allows for a user-initiated recovery from system failure. Such user-initiated updates will include the most up-to-date balances and transaction histories available to the financial institution. Updates of available credit will occur along with the balance updates for appropriate account types. The account balance and transaction history update frequency can be real-time, nightly batch, or other frequency.

A user can customize the portal display by selecting which of the user's accounts are displayed, sort the order of their financial institutions if they signed up for more than one, and provide defaults for first-time users. Within the custom portal environment, a user can toggle between showing and not showing transaction history (last five transactions) for each account. The user's last selection persists, even if a session is ended and a new one is later begun.

If access to financial institution information has been restricted due to repeated failed login attempts, the portal will display a message to that effect rather than the banking data. Once the customer has contacted the financial institution to restore their account, the data will be available at the portal again. The financial institution notifies the portal of restricted account access via the nightly batch feed, so there will be a delay between the time financial institution information access is restricted/reinstated and the time the restriction/reinstatement is reflected at the portal. If the user uses the "Refresh" link, the portal will be updated to reflect whether the financial institution ID is currently restricted.

Preferably, the financial institution can cancel the portal's access to selected users' data. Cancellation will remove the portal ID from the financial institution profile and should result in the portal being notified. If a portal ID is no longer valid, the portal might notify the financial institution in an automated method that the portal ID is no longer valid. When a financial institution ID or an account within that ID is no longer valid, financial institution will no longer send the portal any data related to that ID/account. When the account information subsequently stops appearing in the nightly dump, the portal should invalidate the user's data by examining the update time stamp for the user's financial institution account data, and the data will no longer be displayed.

Data Security Policies at the Portal

Specific details of one embodiment are set forth below to illustrate security measures that might be adopted in the design of a portal system.

On the explanation page presented during registration, when the "Sign me up!" link is clicked, the user will be passed to the financial institution site. The link the explanation page will pass information about the portal long User ID to the financial institution's sign up page. Financial institution will save the unique the portal ID with the customer profile at financial institution. Multiple portal IDs can be linked to a single financial institution ID. For example: A financial institution customer with a single financial institution login ID (Smith27) associated with a checking and savings account may have multiple the portal IDs (Smithatwork & Smithathome). He (or she) may link both Smithatwork and Smithathome to the financial institution Smith27 login ID. At least five such links should be supported.

The financial institution need not check for uniqueness among the portal IDs. A single portal ID may receive data from multiple financial institution IDs and those IDs may each contain the same checking, savings, and/or credit card accounts. For example: A financial institution customer may have two financial institution login ID's—Jonesbiz & Joneshome. Jonesbiz has a consumer checking and a business checking account. The Joneshome ID has the same consumer checking account associated with it. The same customer has a single the portal ID (Jonesisgreat). He (or she) may link Jonesisgreat to both financial institution IDs.

Users who have more than one portal account in which they wish to display information, or who wish to display information for multiple financial institution accounts in a single the portal account, might be required to re-register for each portal ID in the usual registration manner.

The long portal user ID that is passed to financial institution for registration might start with a randomly generated "n" value, comprising 13 alphanumeric characters. This "n" value is generated when the portal account is created. When a portal user's account is discontinued and the portal ID recycled, the "n" value is used to distinguish the old and the new portal accounts for the given portal ID. Following the "n" value is the portal ID, a slash, and a domain character. The portal ID is up to 32 alphanumeric, underscore, and/or plus-sign characters, and the domain is one character. Any "+" and "/" characters appearing in a RUL will be RUL-encoded. The format is:

N-valueYahooID/DomainCharacter

For example:

0000483729012johnb/y

In the above example, "0000483729012" is the thirteen-character "n" value, "johnb" is the portal ID, and "y" is the domain. An example URL format is a GET request to https://yahoo.<fin-inst>.com/signup?c=0000483729012johnb%2fy&p=yahoo After a successful login at the financial institution, the user is directed back to the portal site, and the user's current balance will immediately be transferred to the portal using Immediate Transfer Procedures outlined below.

The portal can receive and transmit user data in the OFX message standard, but allows for CSV as an option. A financial institution may send either incremental nightly updates or complete transaction lists each night to the portal. Options for batch transfer are scp, email, or FTP. Batch files might be compressed with gzip. In the case of FTP or scp, the portal should be notified the transfer is complete if possible by sending an HTTP GET request to a prespecified URL. Data transferred via email or FTP should be both encrypted and signed with PGP public key encryption.

Where the portal is an OFX client to the financial institution server, and thus must parse an OFX request, all OFX responses should be "pulled" rather than "pushed" responses. In the case of an immediate update that is initiated by the financial institution, the financial institution should not directly push the data, but should instead make an HTTP request to a portal server, which will in turn cause an HTTP request to the financial institution's server and the data exchange will then occur exactly as if the user had initiated the request.

For securing the OFX communications, immediate transfers should be pulled by the portal using a secure connection, such as SSL. The HTTP request that the financial institution makes should only contain the portal-assigned long User ID, not the user's account number. The financial institution's OFX server should handle the portal client as a single user, meaning there will be one login ("portalmaster") and some password for the portal. The password should change periodically, and the changes should be coordinated between the financial institution and the portal.

For CSV data transfers, slightly different procedures might be needed. For example, immediate transfers take place when a user initiates a refresh, and when the user first signs up for the service. In the case where a user has just signed up for service, the financial institution might post a request to the portal server, with the contents of the POST request being in the standard CSV format. In the case where a user initiates a refresh, the portal might post a request to a financial institution server in a secure session (using SSL or other means), to which the financial institution's server would respond with data in the standard CSV format. Immediate transfer data should not be compressed, since the overhead needed to decompress will likely take more time than is saved by compressing the data.

All login sessions on the restricted access server will be logged and an audit trail will be in place.

Automatic intraday updates might be done without user request throughout the day for accounts whose data has changed since the nightly dump. There are two methods of achieving this. One way is periodic polling for a batch file, where the portal downloads batch file updates periodically (e.g., once per hour). This should be done, for simplicity, using the same method and format as for the nightly dumps, except that the financial institution may want to only include in the intraday batch file only data for accounts whose balance or transaction history has changed since the nightly dump. Single-user, immediate updates initiated by the financial institution deal with the second method. Each time there is an update in a user's account, the financial institution sends an update request to a portal server which then requests the data from a secure server at the financial institution. The pull method should be exactly the same as if it were user-initiated, querying either an OFX or CSV server.

A data dictionary specifying what type of accounts (such as Checking, Savings, etc) are used and the type of data transferred should be provided to the portal by the financial institution. For each type of account, the data items should be specified, such as balance, account nickname, etc. For each data item, the format and range of the data item should be specified along with any notes needed to correctly interpret the data.

A fairly small subset of OFX might be enough to implement the system, such as the sign on message response (SIGNONMSGSRSV1), followed by the financial institution message response (BANKMSGSRSV1). The BANKMSGSRSV1 message includes the (financial institution) statement response (STMTRS) and/or the credit card statement response (CCSTMTRS). These contain balance and transaction history. The ACCTID field in the BANKACCTFROM aggregate should contain the masked account number (only showing the last four digits), and the portal LONGID should contain the long portal user ID.

For the CSV data, information can be presented as multi-line records of comma separated fields, in the following manner: each line of the CSV file will begin with a single-character record type code. Record type codes are: U=User, A=Account, T=Transaction. Each line containing a user record will be "U", followed by the long the portal ID, and then a status code. Each line containing an account record will be "A", followed by the account type code, and other information. Account type codes are: S=Savings, C=Checking, P=Credit Card, L=Line of Credit. Other codes can be added as needed for additional account types needed for the financial institution.

Details by account type are:
a. Checking: "A", followed by "C", the account name, the masked account number, the balance timestamp, the balance, account status (A for 'Active', R for 'Restricted'), a unique account identifier (could be the full account number encrypted), and the currency (USD for U.S. dollar). Currency should be represented by the official three-letter currency code.
b. Savings: "A", followed by "S", the account name, the masked account number, the balance timestamp, the balance, the account status (A for 'Active', R for 'Restricted'), a unique account identifier, and the currency.
c. Credit Card: "A", followed by "P", the card type (VI=Visa, MC=Master Card, etc.), the account name, the masked account number, the balance timestamp, the balance, the available credit, minimum payment due, payment due date, total credit account status, a unique account identifier, and the currency.
d. Line of Credit: "A", followed by "L", followed by the appropriate fields of information for Line of Credit accounts.

The unique account identifiers should not be the account number, and should not change over time for a given account. This can be implemented as an encryption of the account number with a one-to-one relationship. Each line containing a non-credit-card transaction record will be "T", followed by the transaction descriptor, the post date, and the amount. Each line containing a credit-card transaction will be "T", followed by the transaction descriptor, the post date, the transaction date, the reference number, and the amount. All records for a given user should come immediately after the user's "U" record, and all transaction records for a given account should come immediately after the "A" record to which they belong. A "U" section is considered ended when a new "U" record or end-of-file is encountered, and an "A" section is considered ended when a new "A" record, new "U" record, or end-of-file is encountered. All timestamps might be of the form "YYYYMMDDhhmm", representing the 4-digit year, 2-digit month, 2-digit day, 2-digit hour, and 2-digit minutes, in military time, GMT. An example is:

U, 0000483729012johnb/y, A
A, C, "My Checking Account", XXXX-XXXXX-4321, 199902080630, 100.00, A, aa56jfz8f 8, USD
T, "ATM Withdrawal", 199901101415, −40.00
T, "Deposit", 199901121235, 1000.00
A, S, "My Savings Account", XXXX-XXXXX-9876, 199902080630, 2000.00, A, 47fjk78s i72, USD
T, "Deposit", 199901021012, 1500.00
T, "Transfer to Checking", 199901051845, −500.00

In the above example, user "johnb" has two accounts. One is a checking account, named "My Checking Account", with a balance of $100.00, and a transaction history including an ATM withdrawal, and a deposit. The other is a savings account, named "My Savings", with a balance of $2,000.00, and a transaction history including a deposit and an intrafinancial institution fund transfer.

In one embodiment, data is transferred from the financial institution to the portal via the public Internet and encrypted with either a public key encryption scheme or SSL. At the portal, the data is decrypted on a restricted access machine and then encrypted with a different key before it is stored in the portal user database (UDB). Only the restricted access machine contains the key needed for decrypting the data stored in the UDB. The web server decrypts the data just before delivering the HTML page to the end user via the public Internet. This final delivery is SSL encrypted.

Security

Several optional features can be put in place in the basic portal-financial institution system to secure the user account at the financial institution. One feature that should not be optional is limiting the portal server to read-only service. With read-only service, the user can use the portal interface to view account data, but must connect to the financial institution servers to conduct financial transactions (and authenticate there). Preferably, users must also authenticate with the financial institution to initiate or cancel the services. Another security feature is masking of account numbers provided to the portal servers, so that the portal never has the capability to identify an individual specific account. Using the system described herein, the portal never needs the user's account number or the users' ID or password at the financial institution.

Another security feature is shown in FIG. 4. As illustrated there, a new security key is required in addition to an existing portal ID and password. This is needed, in part, because existing portal passwords (and associated cookies) are sent in cleartext between the user client and the portal server. A security key is preferably created and entered via SSL. Additional constraints can be added, such as requiring a six character minimum for the security key, not allowing security keys that relate to the portal data (such as not being a substring of a portal ID, first name, last name, portal password, etc.).

As shown in FIG. 4, the portal sewer stores "S cookie" identifiers in memory at the user client (preferably, the s cookie is not stored in permanent memory at the user client but instead disappears at the end of a session). An S cookie identifies a user that has entered their security key. The S cookies are stored in a secure server in the portal's domain, visible only to a limited number of portal servers. Portal servers with access to encryption/decryption keys and servers with access to the S cookies reside within a security perimeter providing additional access controls. For example, servers within the perimeter might be logically accessible to five or fewer portal employees, with access to the machines reliably logged.

The secured cookie servers might be located behind a secondary firewall that allows only network traffic minimally needed to provide the necessary services. Access to banking data by other portal servers, such as those that interface directly with end users over the public Internet, should be logged to help identify compromise of such a server or unauthorized access by portal employees.

Where the user forgets a security key, the portal can provide a challenge-response to partially authenticate the user. When a user forgets a security key, but can respond correctly to the challenge, the user is issued a new one-time-use security key via e-mail or other method of sending data to a location previously associated with the user. Customer support representatives might also perform this verification and generate a one-time-key.

In addition to keeping the security keys secure, the user data should also be secured. If the user data is stored where many employees have access, it should be stored in encrypted form with triple-DES or another encryption method. Customer support tools should also not provide access to secure data.

As shown in FIG. 5, data is transferred securely from the financial institution to the portal (in this case, Yahoo!) via the public Internet. Transfer method varies with the format chosen (OFX or CSV). Nightly batch files in either OFX or CSV format are encrypted and signed using PGP before delivery to Yahoo!. Files are delivered via FTP to a special purpose server with access restrictions. Real-time delivery of either initial registration data or a user-initiated refresh of the data depends on the OFX or CSV format. For OFX, Yahoo! initiates an SSL request as a client of the financial institution's OFX server, providing a general Yahoo! password (as opposed to a specific password for an individual user) and requesting data for a specific Yahoo! ID. For CSV, data transfer requests again use SSL, with HTTP basic authentication to verify the source. Transfer may be initiated on either side, depending on financial institution requirements. For additional security, the financial institution server might only respond to portal requests that come from a predetermined IP address and require the use of certificates on both ends of the connection. Users access the web pages offered by the service via SSL or other secure transport.

The above description is illustrative and not restrictive. Many variations of the invention will become apparent to those of skill in the art upon review of this disclosure. For example, a trusted portal-financial institution system might be combined with a "stand-in" system to provide users access to financial institutions that have set up trusted portal-financial institution connections and financial institutions that have not. The scope of the invention should, therefore, be determined not with reference to the above description, but instead should be determined with reference to the appended claims along with their full scope of equivalents.

What is claimed is:

1. An information portal system comprising:
   a portal server comprising logic operable to:
   authenticate a user logging onto the portal server using user-portal authentication data to access user data received at least in part from a server of an institution in response to received portal-institution authentication data and an identification of the user at the portal server,
   wherein the portal-institution authentication data differs from a user-institution authentication data; and
   perform on the user's data an action selected from a first set of actions.

2. The information portal system of claim 1, wherein the first set of actions first set of actions is further restricted to a second set of actions that is a subset of the first set of actions.

3. The information portal system of claim 2, wherein the institution is a financial institution, the user data is financial transaction information, the first set of actions includes conducting a financial transaction and the second set of actions includes viewing user data but the second set of actions does not include conducting financial transactions.

4. A computer-implemented method for providing access to information, the method comprising the acts of:
   authenticating a user logging onto a portal server;
   initiating communication to a user, responsive to successful login by the user, a link to an institution server, the link providing to the institution server an identification of the user at the portal server, and responsive to activation by the user of the link, the link enabling the user to authenticate itself with the institution server based upon user-institution authentication data, the authentication of the user with the institution server resulting in authorization of the portal system to receive user data from the institution; and
   enabling the portal server to authenticate itself with the institution server using portal-institution authentication data, the portal-institution authentication data different from the user-institution authentication data, and to receive the user data if the authentication of the user with the institution server was successful.

5. The method of claim 4, further comprising the acts of:
   initiating display of at least a portion of the user data to the user; and
   receiving input, from the user, describing an action to be performed on the user data, the action selectable, by the user, from a first set of actions presented to the user by the portal system.

6. The method of claim 5, wherein the first set of actions presented to the user is selected from a second set of actions, wherein the first set of actions is a subset of the second set of actions.

7. The method of claim 6, wherein the institution is a financial institution, the user data is financial transaction information, the second set of actions includes conducting a financial transaction and the first set of actions includes viewing user data but the first set of actions does not include conducting financial transactions.

8. The method of claim 4, further comprising retaining the identification of the user at the institution server and associating the identification of the user with a user account at the institution to which the user data pertains.

9. The method of claim 4, wherein the link is one of a plurality of links presented to the user from the portal system, each of the plurality of links operable to link the user with an institution at which the user maintains an account, and to provide the user an opportunity to authenticate with the respective linked institution and authorize delivery of user data at that institution to the portal system.

10. The method of claim 4, wherein the link presented to the user by the web page logic is further operable to enable the user to authorize the institution server to deliver, to the portal server, user data regarding a plurality of user accounts at the institution, the authorization for each account based on user-institution authentication data corresponding to that account.

11. Apparatus for providing access to financial information, the apparatus comprising:
- logic for accepting a connection at an institution server, the connection initiated by a user following a link from a portal, the link including a user identification at the portal server;
- logic responsive to the connection, enabling the user to authenticate with the institution server using user-institution authentication data; and
- logic for servicing a request by the portal, after authenticating the portal using portal authentication data, by providing, to the portal, data of the user at the institution, wherein the user-institution authentication data and the portal authentication data are different.

12. The apparatus of claim 11, wherein the user identification includes a user portal ID, and the institution retains the user portal ID for the association with the portal.

13. The apparatus of claim 11, further comprising logic for accepting a plurality of connections at the institution server, the connections initiated by a plurality of different users following respective links containing respective user identifications, each link from the portal;
- logic for enabling each user of the plurality to authenticate with the institution server using respective user-institution authentication data;
- logic for responding to each authentication by associating respective user identifications with the portal; and
- logic for servicing requests by the portal, after authenticating the portal using portal authentication data, by providing, to the portal, data of users of the plurality associated with the portal.

14. The apparatus of claim 11, further comprising logic for providing the user an opportunity to indicate that the institution may provide, to the portal, information for each of a plurality of user accounts at the institution.

15. The apparatus of claim 11, further comprising logic for revoking authorization of the portal to receive the user data.

16. Apparatus for providing access to financial information, the apparatus comprising:
- logic for authenticating a user based on received user-portal authentication information;
- logic for providing the user a link to an institution server for providing user-institution authentication information to the institution server, wherein the link includes a user identification at the portal server;
- logic for authenticating the portal with the institution using portal-institution authentication information, wherein the portal-institution authentication information and the user-portal authentication information are different.

17. The apparatus claim 16, further comprising:
- logic for obtaining user data stored at the institution; and
- logic for performing on the user data an action selected from a first set of actions.

18. The apparatus claim 16, wherein the logic for authenticating the portal with the institution includes logic for initiating a trusted connection between a portal server and a server of the institution using the portal-institution authentication information; and further comprising logic for providing for reception of the user data, over the trusted connection, through one or more of batch requests and user initiated requests.

19. The apparatus of claim 16, further comprising:
- logic for authenticating a plurality of users with the portal by determining whether respective user-provided information matches respective stored user authentication information; and
- logic for providing each user a link to the institution server, the link for providing that user an opportunity to indicate to the institution server that the portal may obtain user data stored at that institution.

20. The apparatus of claim 16, further comprising logic for indicating to the institution that the user-portal identification is no longer valid.

21. The apparatus of claim 16, wherein the user identification includes a user portal ID, and the method further comprises the institution server retaining the user portal ID for determining whether the portal is authorized to obtain the user data at that institution.

* * * * *